United States Patent
Li

(10) Patent No.: US 11,283,987 B2
(45) Date of Patent: Mar. 22, 2022

(54) FOCUS REGION DISPLAY METHOD AND APPARATUS, AND STORAGE MEDIUM

(71) Applicant: GUANGDONG OPPO MOBILE TELECOMMUNICATIONS CORP., LTD., Guangdong (CN)

(72) Inventor: Xiaopeng Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 7 days.

(21) Appl. No.: 16/706,660

(22) Filed: Dec. 6, 2019

(65) Prior Publication Data

US 2020/0112685 A1    Apr. 9, 2020

Related U.S. Application Data

(63) Continuation of application No. PCT/CN2018/091227, filed on Jun. 14, 2018.

(30) Foreign Application Priority Data

Jun. 16, 2017  (CN) .......................... 201710458367.1

(51) Int. Cl.
  *H04N 5/232*    (2006.01)
  *G06T 7/90*    (2017.01)

(52) U.S. Cl.
  CPC ......... *H04N 5/232121* (2018.08); *G06T 7/90* (2017.01); *H04N 5/23219* (2013.01); *H04N 5/232127* (2018.08)

(58) Field of Classification Search
  CPC ....... H04N 5/232121; H04N 5/232127; H04N 5/23219; H04N 5/232933;
  (Continued)

(56) References Cited

U.S. PATENT DOCUMENTS

2008/0013851 A1    1/2008  Ishiwata et al.
2015/0022713 A1    1/2015  Kimoto
(Continued)

FOREIGN PATENT DOCUMENTS

CN    102415090 A    4/2012
CN    103024265 A    4/2013
(Continued)

OTHER PUBLICATIONS

English Translation of International search report issued in corresponding international application No. PCT/CN2018/091227, dated Sep. 10, 2018 (2 pages).
(Continued)

*Primary Examiner* — Yogesh K Aggarwal
(74) *Attorney, Agent, or Firm* — Young Basile Hanlon & MacFarlane, P.C.

(57) ABSTRACT

The present application provides a method and an apparatus for focus region displaying, and a non-transitory storage medium. The method may include: acquiring a target ROI from a preview image collected by an image sensor, photographing the target object to acquire image data, and displaying, during imaging using the image data, the position of the target ROI on the image. During the imaging of a target object, a focus region which has been determined during focusing may be marked on the image.

15 Claims, 8 Drawing Sheets

(58) Field of Classification Search
CPC ......... H04N 5/232945; H04N 5/23212; H04N 5/23222; G06T 7/90
See application file for complete search history.

(56) References Cited

U.S. PATENT DOCUMENTS

| | | | |
|---|---|---|---|
| 2015/0207979 A1 | 7/2015 | Kamiya | |
| 2016/0295100 A1* | 10/2016 | Yokozeki | ......... H04N 5/232945 |
| 2016/0330366 A1* | 11/2016 | Kinoshita | .......... H04N 5/23219 |

FOREIGN PATENT DOCUMENTS

| CN | 103780824 A | 5/2014 |
|---|---|---|
| CN | 103780826 A | 5/2014 |
| CN | 104270562 A | 1/2015 |
| CN | 104460185 A | 3/2015 |
| CN | 105872363 A | 8/2016 |
| CN | 106161962 A | 11/2016 |
| CN | 107295252 A | 10/2017 |

OTHER PUBLICATIONS

English Translation of Chinese First Search Report issued in a counterpart Chinese patent Application 201710458367.1, dated Mar. 29, 2019 (1 pages).
English Translation of Chinese Second office action issued in the counterpart Chinese patent Application 201710458367.1, dated Aug. 5, 2019 (9 pages).
European search report, EP18817013, dated May 7, 2020 (9 pages).
English translation of Third Office Action from China patent office in a counterpart Chinese patent Application 201710458367.1, dated Dec. 4, 2019 (8 pages).
Indian First Examination Report for IN Application 201917052991 dated Mar. 15, 2021. (6 pages).
Communication pursuant to Article 94(3) EPC for EP Application 18817013.8 dated Nov. 15, 2021. (10 pages).

* cited by examiner

FOCUS REGION DISPLAY METHOD AND APPARATUS, AND STORAGE MEDIUM

CROSS-REFERENCE TO RELATED APPLICATION(S)

The present application is a continuation application of International Patent Application No. PCT/CN2018/091227, filed on Jun. 14, 2018, which claims priority to Chinese Patent Application No. 201710458367.1, filed on Jun. 16, 2017, the entire disclosures of both of which are hereby incorporated by reference in their entireties.

TECHNICAL FIELD

The present disclosure relates to the technical field of terminals, and in particular, to a focus region display method, an apparatus, and a storage medium.

BACKGROUND

With development of smart terminals, the frequency at which users can take pictures with smart terminals becomes higher and higher, and the requirement of users for the quality of images photographed by smart terminals also becomes higher and higher.

At present, most cameras of smart terminals support automatically focusing so as to obtain an optimum clear point to take pictures. However, even if a focusing region is determined, a problem that photographed images are out of focus may occur, such that the photographed images are blurred. In actual use, when taking pictures, if a hand of a user trembles or a photographed object is in a moving state, it may also be caused that an image obtained by photographing loses a correct region of interest (ROI), which is usually called a focusing region.

In these situations, a user can only see an out-of-focus or blurred image, and cannot determine whether the reason of the out-of-focus or blurred image is caused by inappropriate setting of the ROI.

SUMMARY

The present disclosure is intended to solve one of the technical problems in the related art at least to a certain extent.

In view of this, the present disclosure provides a focus region display method, in order to realize displaying a focus region to a user in a photographed image and thereby solve the problem in the prior art that it is unable to determine whether a reason of an out-of-focus or blurred image is caused by inappropriate setting of the focus region.

The present disclosure provides a focus region display apparatus.

The present disclosure provides a non-transitory computer readable storage medium.

An embodiment of a first aspect of the present disclosure provides a focus region display method, comprising: acquiring a target ROI from a preview image of a target object captured by an image sensor; photographing the target object to acquire image data; and displaying a position of the target ROI in generating an image through the image data.

In the focus region display method of this embodiment of the present disclosure, when imaging using the image data, a focus region determined during focusing can be marked in the image. When the image is out of focus or blurred, if the position of the marked ROI and the position of the ROI during focusing do not change, a user can quickly identify that the reason of the out-of-focus or blurred image is not caused by inappropriate setting of the ROI. Especially for human face imaging, if a frame of the marked ROI is within a human face region, and if an image is blurred or out of focus, the factor of inappropriate setting of the ROI can be excluded.

An embodiment of a second aspect of the present disclosure provides a focus region display apparatus, comprising a set of computer instructions stored on a non-transitory computer readable medium and executable by a computer processor to: acquire a target ROI from a preview image of a target object; photograph the target object to acquire image data; and display a position of the target ROI in a image during a process of imaging using the image data.

In the focus region display apparatus of this embodiment of the present disclosure, when imaging using the image data, a focus region determined during focusing can be marked in the image. When the image is out of focus or blurred, if the position of the marked ROI and the position of the ROI during focusing do not change, a user can quickly identify that the reason of the out-of-focus or blurred image is not caused by inappropriate setting of the ROI. Especially for human face imaging, if a frame of the marked ROI is within a human face region, and if an image is blurred or out of focus, the factor of inappropriate setting of the ROI can be excluded.

An embodiment of a third aspect of the present disclosure provides a non-transitory computer readable storage medium, which stores a computer program; when the computer program is executed by a processor, the focus region display method according to the embodiment of the first aspect is implemented.

Additional aspects and advantages of the present disclosure will be partially provided in the following description, and these parts will become clear in the following description or be appreciated through practice of the present disclosure.

BRIEF DESCRIPTION OF DRAWINGS

The above and/or additional aspects and advantages of the present disclosure will become clear and understandable in the following description of the embodiments in combination with the drawings as follows.

DETAILED DESCRIPTION

Figure 1:
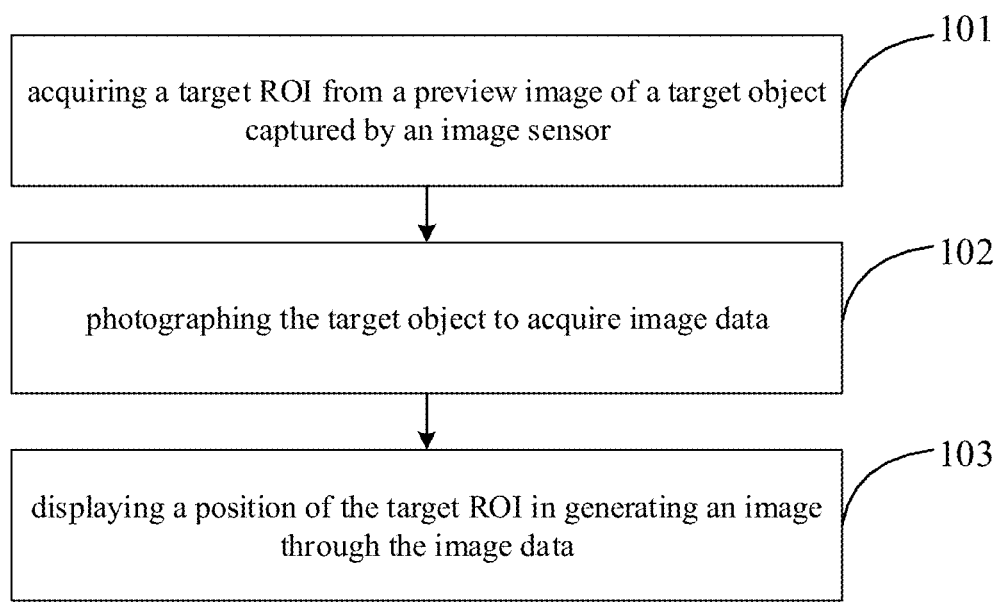
FIG. 1 is a schematic flow chart of a focus region display method provided by an embodiment of the present disclosure.

Embodiments of the present disclosure are described in detail below. Examples of the embodiments are shown in the drawings, wherein same or similar reference numbers represent same or similar components or components having same or similar functions throughout. The embodiments described with reference to the drawings below are examples and intended to illustrate the present disclosure, and should not be considered as limiting the present disclosure.

Focus region display methods, apparatuses, and terminal devices of the embodiments of the present disclosure are described with reference to the drawings below.

FIG. 1 is a schematic flow chart of a focus region display method provided by an embodiment of the present disclosure. This embodiment of the present disclosure can be used in a process during which a user photographs a terminal. Wherein, the terminal can be hardware devices with various operation systems, such as smart phones, tablet computers, personal digital assistants, and so on.

As shown in FIG. 1, the focus region display method includes the following steps.

S101, acquiring a target ROI from a preview image of a target object captured by an image sensor.

When a user activates an imaging apparatus of a terminal, such as a camera, a preview image imaged for a target object to be photographed by an image sensor in the camera can be displayed in a photographing interface of the terminal. In this embodiment, a target ROI can be acquired from the captured preview image. For example, it is possible to select a region as the target ROI in the preview image by an automatically focusing technology; further for example, it is possible that the user manually selects a region as the target ROI in the preview image.

During an actual photographing process, when a camera is aligned with a target object, the target object may not be in a stable state, and the target object often needs short time to enter a stable state. For example, when the target object is a person, during a photographing process, the target object often needs time of 3-5 frames to adjust the pose or stand stably, even through during the whole process, the camera continuously captures the preview image of the target object, and displays the ROI in the preview image. However, in order to acquire clear images, it is possible to acquire the target ROI from the preview image currently captured by the image sensor when the target object is in a stable state.

For example, if a target object to be photographed is a human face, when the human face is in a stable status, automatically focusing can be performed, and a region in a preview image where the human face is located is used as a focus region. Further for example, if a target object to be photographed is a tree, when the tree to be photographed is in a stable status, automatically focusing is performed, and a region in a preview image where a crown of the tree is located can be used as a focus region.

S102, photographing the target object to acquire image data.

Specifically, the user can send photographing instruction by pressing a shutter button. When the photographing instruction has been detected, the target object is photographed to acquire the image data. It should be noted that, during an actual photographing process, after the target object is photographed, the image data of the target object can be cached into a specified buffer, for example, storage devices, such as a flash card of a photographing apparatus can be used as the buffer.

S103, displaying a position of the target ROI in generating an image through the image data.

In order that an image of the target object can be displayed on the photograph interface for the user, when the image data of the target object has been acquired, the image data can be used to image. In actual use, when the focus region is set improperly, images photographed by the photographing apparatus may appear out-of-focusing or blurring phenomena. In order to identify whether the aforesaid phenomena is caused by an improperly set focus region, in this embodiment, the target ROI can be marked in the image, specifically, a frame is drawn for the target ROI, a target position of the target ROI in the image is determined, and the target ROI with the frame is displayed at the target position in the image.

In the focus region display method of this embodiment, when imaging using the image data, a focus region determined during focusing can be marked in the image. When the image is out of focus or blurred, if the position of the marked ROI and the position of the ROI during focusing do not change, a user can quickly identify that the reason of the out-of-focus or blurred image is not caused by inappropriate setting of the ROI. Especially for human face imaging, if a frame of the marked ROI is within a human face region, and if an image is blurred or out of focus, the factor of inappropriate setting of the ROI can be excluded.

Figure 2:
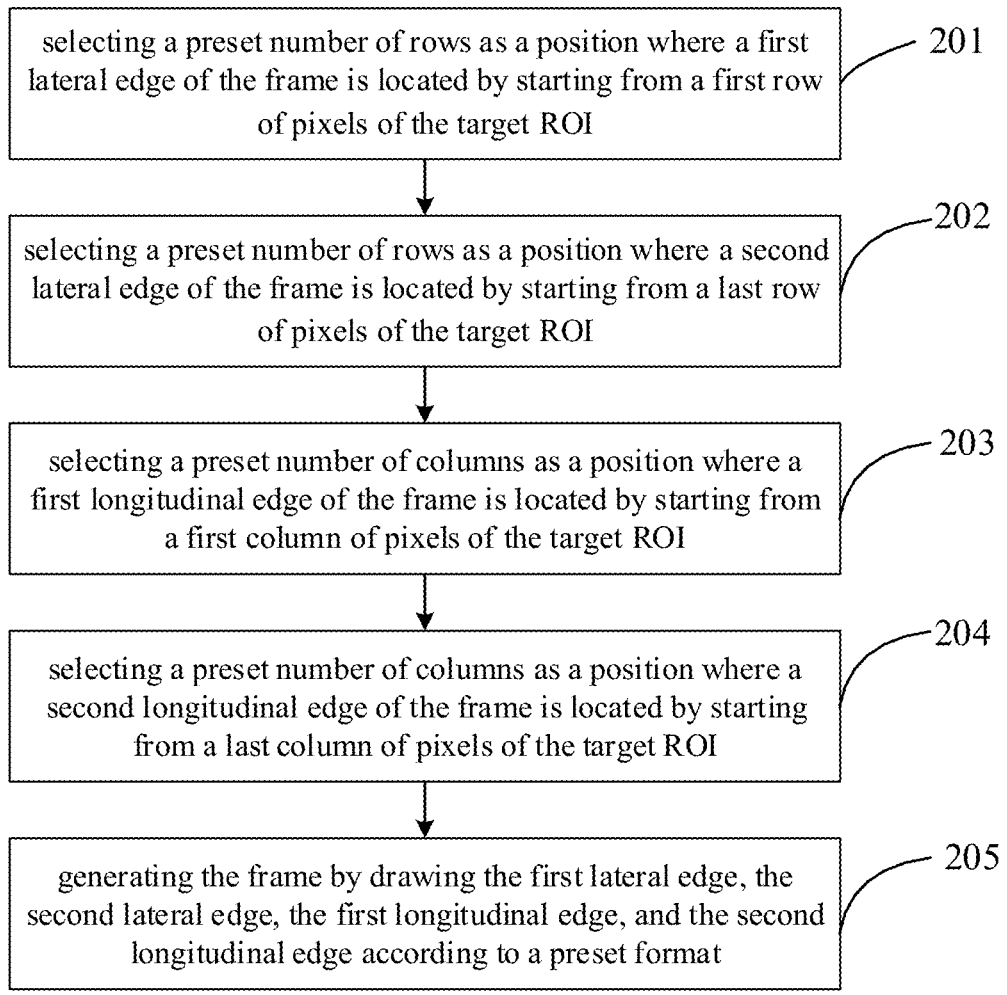
FIG. 2 is a schematic flow chart of drawing a frame for a target ROI provided by an embodiment of the present disclosure.

In order to describe the process of drawing the frame for the target ROI more clearly, an embodiment of the present disclosure provides another focus region display method, FIG. 2 is a schematic flow chart of another focus region display method provided by this embodiment of the present disclosure.

As shown in FIG. 2, on the basis of the above embodiment as shown in FIG. 1, drawing the frame for the target ROI specifically includes the followings steps.

S201, selecting a preset number of rows as a position where a first lateral edge of the frame is located by starting from a first row of pixels of the target ROI.

Specifically, a row where a pixel at a top left corner of the target ROI is located is used as the first row, and a column where the pixel is located is used as the first column. In this embodiment, starting from the first row of pixels, that is, starting from the row where the pixel at the top left corner is located, a preset number of rows are selected as the first lateral edge of the frame.

S202, selecting a preset number of rows as a position where a second lateral edge of the frame is located by starting from a last row of pixels of the target ROI.

Specifically, a row where a pixel at a bottom right corner of the target ROI is located is used as the last row, and a column where the pixel is located is used as the last column.

In this embodiment, starting from the last row of pixels, that is, the row where the pixel at the bottom right corner is located, a preset number of rows are selected as the second lateral edge of the frame.

It should be noted that a width of each lateral edge of the frame can be determined according to the preset number of rows. For example, the preset number of rows can be four, correspondingly, a width of each lateral edge is a total width of four pixels.

S203, selecting a preset number of columns as a position where a first longitudinal edge of the frame is located by starting from a first column of pixels of the target ROI.

In this embodiment, starting from the first column of pixels, that is, the column where the pixel at the top left corner is located, a preset number of columns are selected as the first longitudinal edge of the frame.

S204, selecting a preset number of columns as a position where a second longitudinal edge of the frame is located by starting from a last column of pixels of the target ROI.

In this embodiment, starting from the last column of pixels, that is, the column where the pixel at the bottom right corner is located, a preset number of columns are selected as the second longitudinal edge of the frame.

It should be noted that a width of each longitudinal edge of the frame can be determined according to the preset number of columns. For example, the preset number of columns can be four, correspondingly, a width of each longitudinal edge is a total width of four pixels.

Figure 3:
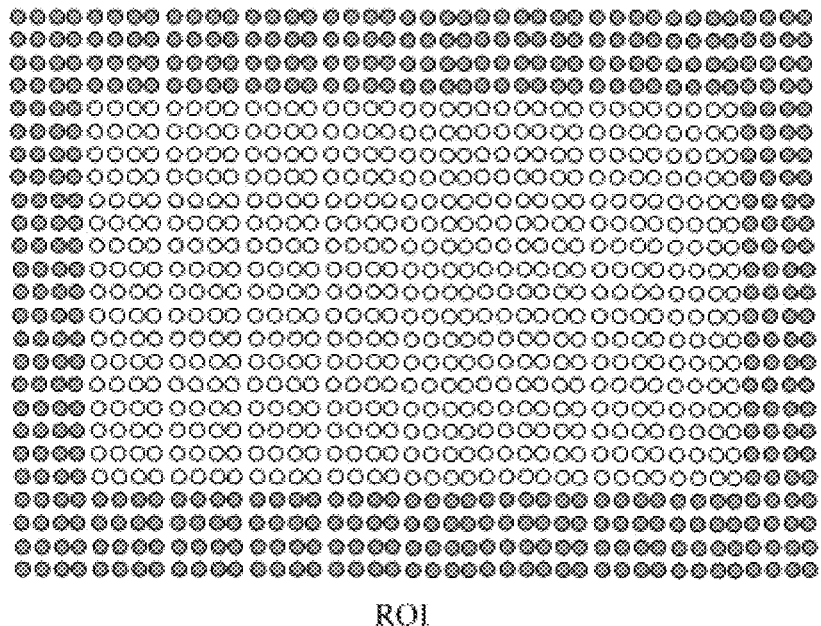
FIG. 3 is a schematic application illustration of determining a frame provided by an embodiment of the present disclosure.

As shown in FIG. 3, which is a schematic illustration of determining a frame provided by an embodiment of the present disclosure. In this figure, the row where the pixel at the top left corner is located is the first row, and the column where the pixel at the top left corner is located is the first column; the row where the pixel at the bottom right corner is located is the last row, and the column where the pixel at the bottom right corner is located is the last column. In this figure, four rows starting from the first row are used as the first lateral edge of the frame, four columns starting from the first column are used as the first longitudinal edge of the frame, four rows starting from the last row are used as the second lateral edge of the frame, and four columns starting from the last column are used as the second longitudinal edge of the frame. In FIG. 3, in order to differentiate from other pixel rows in the target ROI, pixels occupied by each edge of the frame are filled with grey scale.

S205, generating the frame by drawing the first lateral edge, the second lateral edge, the first longitudinal edge, and the second longitudinal edge according to a preset format.

Specifically, a format can be preset; after the lateral edges and the longitudinal edges of the frame are determined, the first lateral edge, the second lateral edge, the first longitudinal edge, and the second longitudinal edge can be drawn according to the preset format, and thus the frame of the target ROI is acquired. The format can include the color of the frame, the shapes of the frame lines, and so on.

Figure 4:
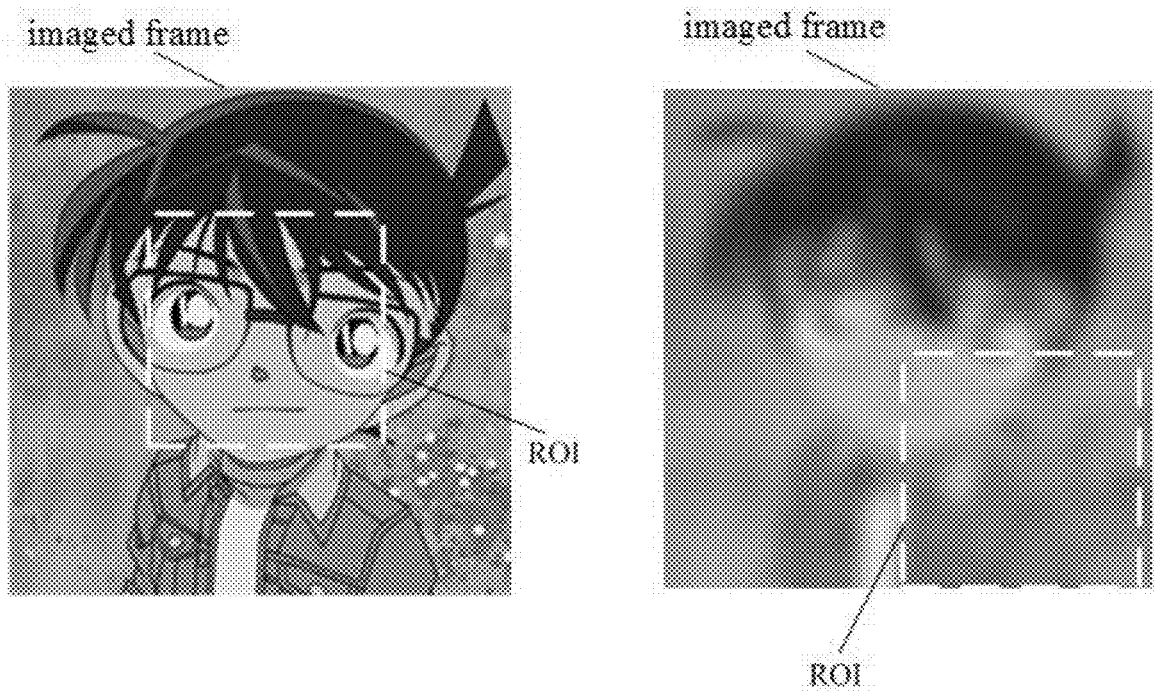
FIG. 4 is a schematic application illustration of displaying a frame of a target ROI in an image provided by an embodiment of the present disclosure.

For example, if the target object is a person, it is possible to automatically identify the human face of the target object as a target ROI during a focusing process after a camera is aligned with the target object, and photograph to acquire an image of the target object, that is, a image in this embodiment. In order that a position of the target ROI determined when focusing in the image can be displayed in the image, the frame of the target ROI can be drawn according to the above method, and thus the frame is displayed in the image. As shown in FIG. 4, this is a schematic application illustration of an embodiment of the present disclosure. When photographing a human face, the region of the human face is often identified as an ROI; in FIG. 4, the left white frame marks that the target ROI is the region of the human face, and thus a clear image can be formed. The right white frame deviates from the region of the human face, and the image appears out-of-focusing or blurred phenomena.

Figure 5:
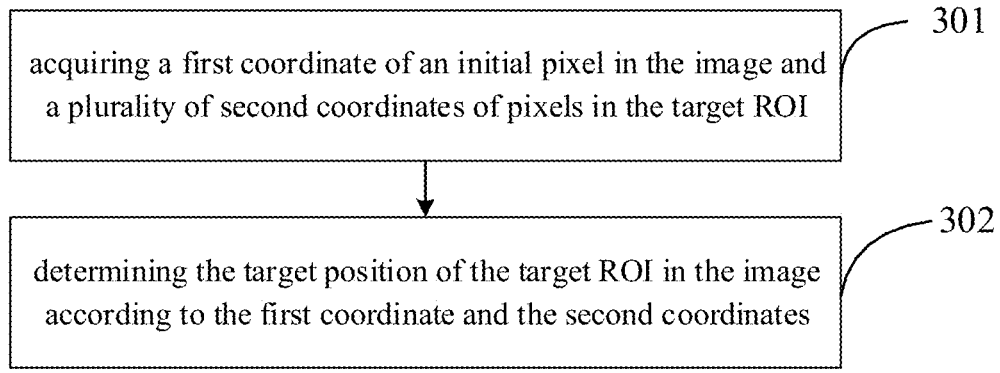
FIG. 5 is a schematic flow chart of determining a target position of a target ROI in an image provided by an embodiment of the present disclosure.

Further, in order that the frame of the target ROI can be displayed accurately in the image, before displaying the frame of the target ROI in the image, the position of the target ROI in the image needs to be determined. FIG. 5 is a schematic flow chart of determining a target position of a target ROI in a image provided by an embodiment of the present disclosure.

Determining the target position of the target ROI in the image specifically includes the following steps.

S301, acquiring a first coordinate of an initial pixel in the image and second coordinates of pixels in the target ROI.

Specifically, the first coordinate of the initial pixel in the image can be acquired according to image data of the image, wherein the initial pixel can be a pixel at the top left corner of the image. Further, the second coordinate of each pixel in the target ROI can be acquired from image data of the target ROI.

S302, determining the target position of the target ROI in the image according to the first coordinate and the second coordinates.

In response to acquiring the second coordinate of each pixel of the target ROI, a position relation of each pixel relative to the first coordinate of the initial pixel of the image can be calculated. The position relation can include a distance between each pixel and the initial pixel and an orientation relation between each pixel and the initial pixel.

In response to acquiring the position relation of the second coordinate of each pixel in the target ROI relative to the first coordinate, correspondingly, the target position of the target ROI in the image is determined.

Figure 6:
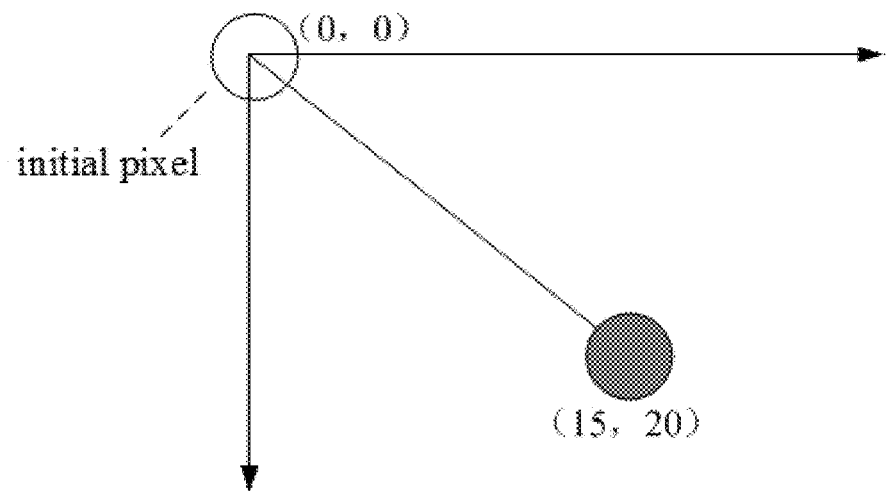
FIG. 6 is a schematic illusion of a position relation between an initial pixel in an image and a certain pixel in a target ROI provided by an embodiment of the present disclosure.

For example, when setting the first coordinate of the initial pixel of the image to be (0, 0), and setting the coordinate of a pixel in the target ROI to be (15, 20), the position relation between the pixel and the initial pixel of the image can thus be determined. As shown in FIG. 6, the white circle dot in the figure represents the initial pixel in the image, and the grey circle dot represents a pixel in the target ROI.

Figure 7:
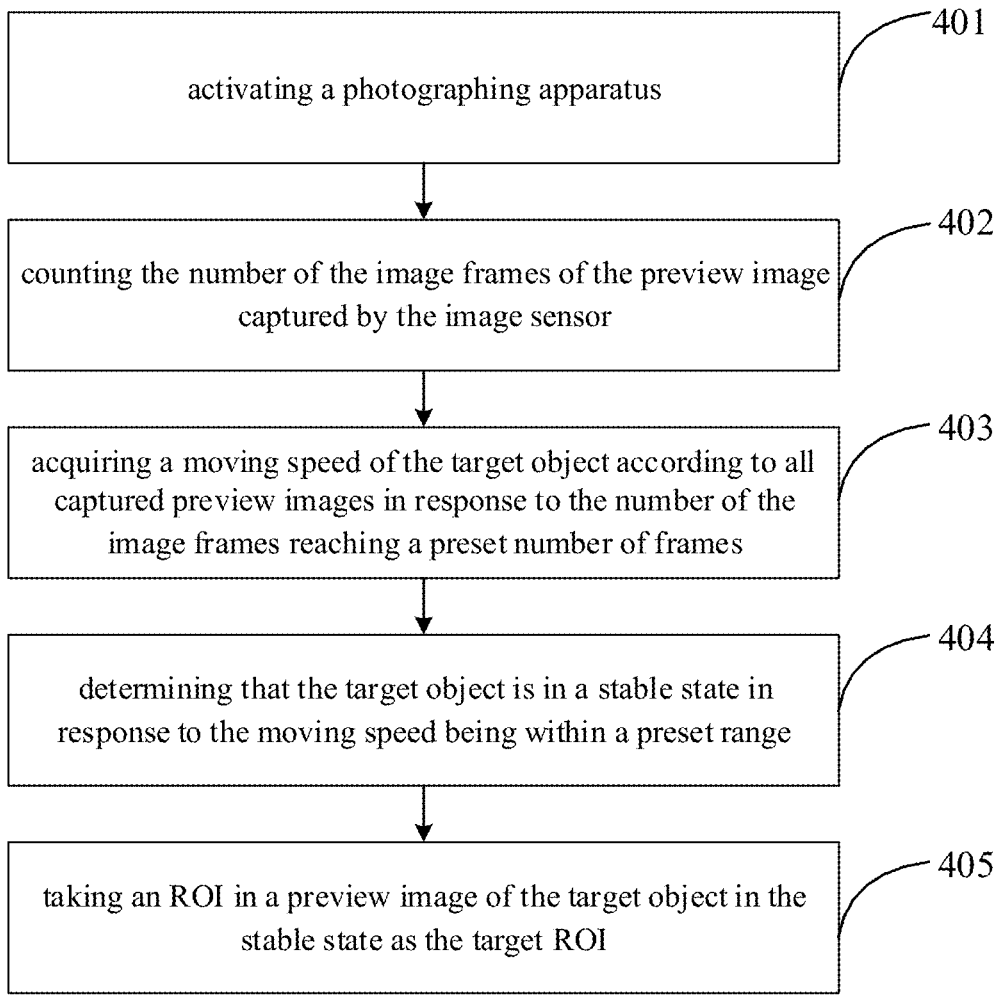
FIG. 7 is a schematic flow chart of acquiring a target ROI from a preview image of a target object captured by an image sensor provided by an embodiment of the present disclosure.

In order that the acquired target ROI can be more accurate and photographed images are more clear, before acquiring the target ROI, it is required to determine that the target object to be photographed is in a stable state. FIG. 7 is a schematic flow chart of acquiring a target ROI from a preview image of a target object captured by an image sensor provided by an embodiment of the present disclosure.

As shown in FIG. 7, acquiring the target ROI from the preview image of the target object captured by the image sensor specifically includes the following steps.

S401, activating a photographing apparatus.

S402, counting the number of the image frames of the preview image captured by the image sensor.

S403, acquiring a moving speed of the target object according to all captured preview images in response to the number of the image frames reaching a preset number of frames.

S404, determining that the target object is in a stable state in response to the moving speed being within a preset range.

In actual use, after a camera is activated, it is required to wait a target object to stable, and then focusing is triggered. In normal circumstances, the target object needs to wait a time length of 3-5 frames of the preview image to stable, specifically, the number of the image frames of the preview image relates to the performance of a terminal used by a user.

In this embodiment, after the user activates the camera, the camera is aligned with the to be paragraphed target object when photographing, then the image sensor in the camera can capture the target object in advance to form the preview image of the target object, and can count the number of the image frames of the preview image captured by the image sensor.

Further, the target object may be in a completely static state; when the number of the image frames reaches a preset number of frames, all preview images can be analyzed, a phase difference between two adjacent frames of preview images can be acquired, and thus the moving speed of the target object is acquired.

After acquiring the moving speed of the target object, it is possible to determine whether the moving speed is within a preset range; if being within the preset range, it can be considered that movement of the target object will not affect the photographing effect, and it can be determined that the target object is in the stable state.

S405, taking an ROI in a preview image of the target object in the stable state as the target ROI.

In order to acquire a clear image, it is possible to acquire the target ROI from the preview image currently captured by the image sensor when the target object is in the stable state, in other words, taking the ROI in the preview image currently captured by the image sensor as the target ROI.

Further, if the target object is a human face, after displaying the position of the target ROI in the image, it is possible to determine whether inaccuracy of determination of the ROI region results in a blurred image according to the position of the ROI and the clearness of the human face in the image. In view of this, an embodiment of the present disclosure provides another focus region display method, and FIG. 8 is a schematic flow chart of another focus region display method provided by the embodiment of the present disclosure.

Figure 8:
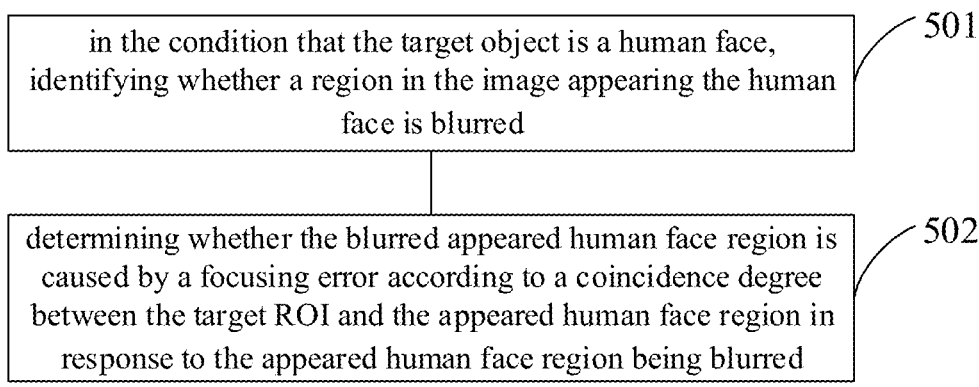
FIG. 8 is a schematic flow chart of another focus region display method provided by an embodiment of the present disclosure.

As shown in FIG. 8, on the basis of the above embodiment shown in FIG. 1, after the step S103, the followings steps can be further included.

S501, in the condition that the target object is a human face, identifying whether a region in the image appearing the human face is blurred.

As a possible implementation, a human face region in the image is identified by a human identification algorithm, pixel values of the human face region are acquired, and color and brightness of the human face region are acquired according to the pixel values and compared with preset threshold values of color and brightness corresponding to a clear human face; if the color and brightness of the human face region are less than the threshold values, it is considered that the human face region is blurred.

S502, determining whether the blurred appeared human face region is caused by a focusing error according to a coincidence degree between the target ROI and the appeared human face region in response to the appeared human face region being blurred.

Specifically, if the region appearing the human face is blurred, region coincidence degree calculation is performed according to the target ROI displayed in the image and the identified appeared human face region. This is because the identified human face region will be defaulted as the ROI when photographing the human face. If the coincidence degree between the ROI region and the human face region is small and less than a preset threshold value, it is indicated that the blurred human face region acquired by photographing is caused by inaccurate identification for the ROI, that is, by a focusing error, as shown in the right part of FIG. 4. Thus, this can help a user to determine that in the human face image acquired by photographing, the blurred human face region is caused by inaccurately focusing. If the coincidence degree between the ROI region and the human face region is great, it is indicated that the blurred human face region is not caused by a focusing error.

In order to implement the above embodiments, the present disclosure further provides a focus region display apparatus.

Figure 9:
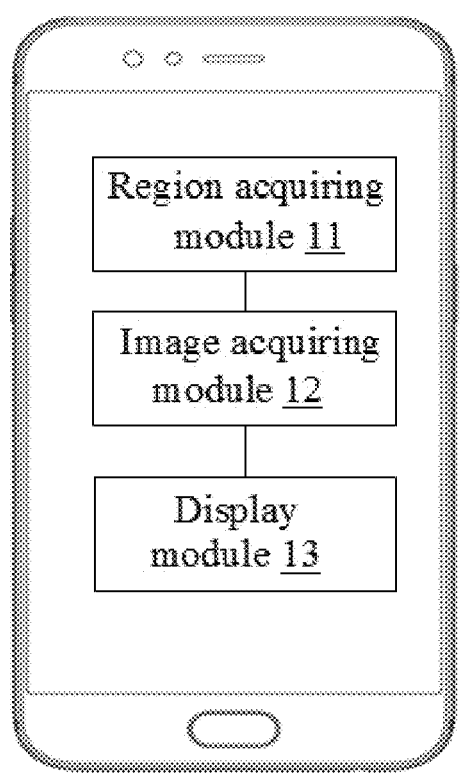
FIG. 9 is a structural schematic view of a focus region display apparatus provided by an embodiment of the present disclosure.

FIG. 9 shows a focus region display apparatus provided by an embodiment of the present disclosure. As shown in FIG. 9, the focus region display apparatus comprises a region acquiring module 11, an image acquiring module 12, and a display module 13.

The region acquiring module 11 is configured to acquire a target ROI from a preview image of a target object captured by an image sensor.

The image acquiring module 12 is configured to photograph the target object to acquire image data.

The display module 13 is configured to display a position of the target ROI in a image during a process of imaging using the image data.

Figure 10:
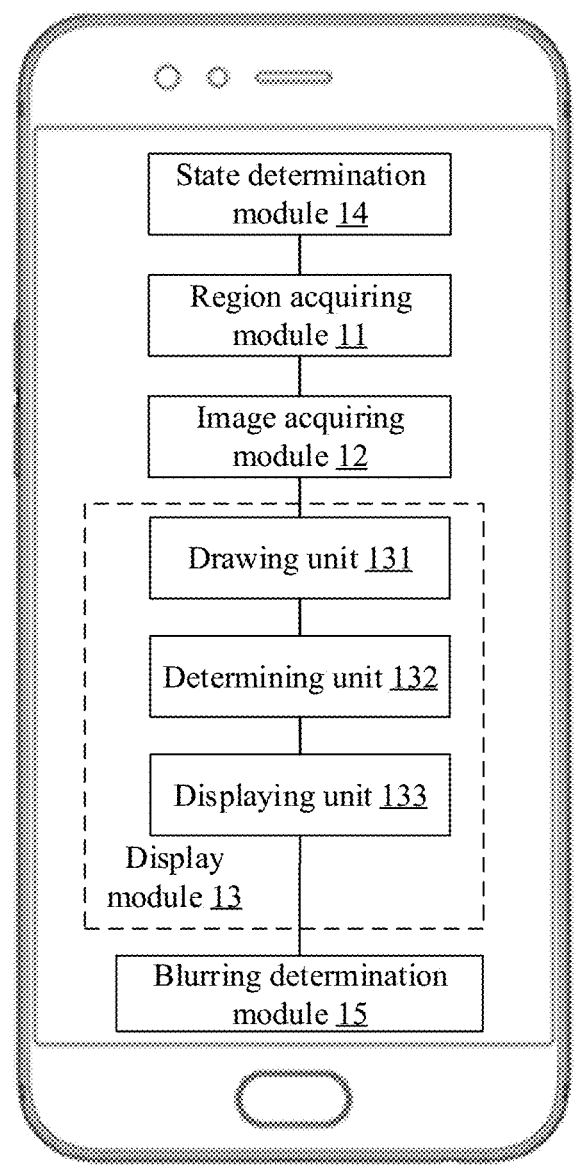
FIG. 10 is a structural schematic view of another focus region display apparatus provided by an embodiment of the present disclosure

Optionally, in a possible implementation of an embodiment of the present disclosure, as shown in FIG. 10, the display module 13 of the focus region display apparatus further includes a drawing unit 131, a determining unit 132, and a displaying unit 133.

Wherein, the drawing unit 131 is configured to draw a frame for the target ROI.

The determining unit 132 is configured to determine a target position of the target ROI in the image.

The display unit 133 is configured to display the frame of the target ROI on the target position of the image.

Further, the drawing unit 131 is specifically configured to: starting from the first row of pixels of the target ROI, select a preset number of rows as a position where the first lateral edge of the frame is located; starting from the last row of pixels of the target ROI, select a preset number of rows as a position where the second lateral edge of the frame is located; starting from the first column of pixels of the target ROI, select a preset number of columns as a position where the first longitudinal edge of the frame is located; starting from the last column of pixels of the target ROI, select a preset number of columns as a position where the second lateral edge of the frame is locate; draw the first lateral edge, the second lateral edge, the first longitudinal edge, and the second longitudinal edge according to a preset format, thereby form the frame.

Furthermore, the determining unit 132 is specifically configured to: acquire a first coordinate of an initial pixel in the image and second coordinates of pixels in the target ROI; according to the first coordinate and the second coordinates, determine the target position of the target ROI in the image.

Further, the focus region display apparatus further comprises a state determination module 14.

The state determination module 14 is configured to determine that the target object is in a stable state according to preview images captured continuously and being compliance with a preset number of frames.

As a possible implementation, the state determination module 14 can be specifically configured to: after the image sensor is aligned with the target object, count the number of the image frames of the preview image captured by the image sensor; when the number of the image frames reaches a preset number of frames, according to all captured preview images, determine a moving speed of the target object; if the moving speed is within a preset range, determine that the target object is in a stable state.

As a possible implementation, the region acquiring module 11 is specifically configured to take an ROI in a preview image of the target object in the stable state as the target ROI.

As a possible implementation, the ROI includes a focusing region.

Further, the focus region display device further comprises a blurring determination module 15 configured to: in the condition that the target object is a human face, identify whether a human face region appeared in the image is blurred; if the appeared human face region is blurred, according to the coincidence degree between the target ROI and the appeared human face region, determine whether the blurred appeared human face region is caused by a focusing error.

In the focus region display apparatus of this embodiment, when imaging using the image data, a focus region determined during focusing can be marked in the image. When the image is out of focus or blurred, if the position of the marked ROI and the position of the ROI during focusing do not change, a user can quickly identify that the reason of the out-of-focus or blurred image is not caused by inappropriate setting of the ROI. Especially for human face imaging, if a frame of the marked ROI is within a human face region, and if an image is blurred or out of focus, the factor of inappropriate setting of the ROI can be excluded.

In order to implement the above embodiments, the present disclosure further provides a terminal device.

Figure 11:
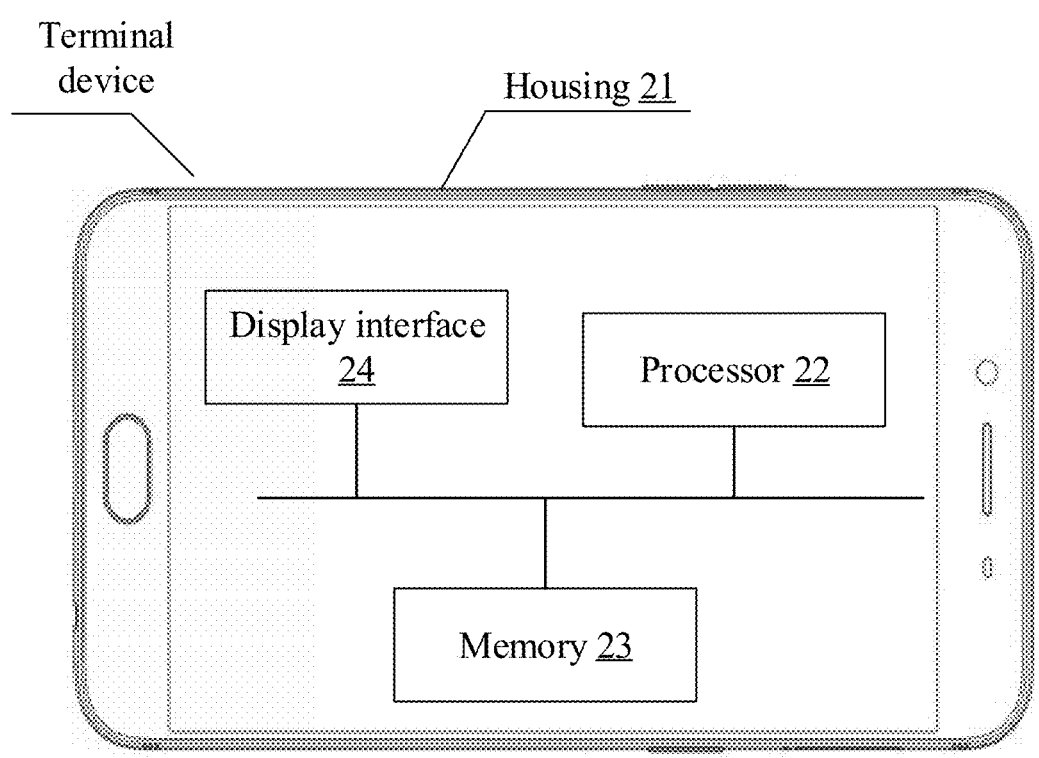
FIG. 11 is a structural schematic view of a terminal device provided by an embodiment of the present disclosure.

FIG. 11 is a structural schematic view of a terminal device provided by an embodiment of the present disclosure.

As shown in FIG. 11, the terminal device comprises a housing 21 and a processor 22, a memory 23, and a display interface 24 which are positioned in the housing 21, wherein, the processor 22 reads executable program codes stored in the memory 23 to run a program corresponding to the executable program codes, and thereby executes the following steps: acquiring a target ROI from a preview image of a target object captured by an image sensor; photographing the target object to acquire image data; and during a process of imaging using the image data, displaying a position of the target ROI in a image.

It should be noted that the above explanation for the embodiments of the focus region display method is also applicable for the terminal device of this embodiment. The implementing principle is similar and is not repeated here.

In the terminal device of this embodiment, when imaging using the image data, a focus region determined during focusing can be marked in the image. When the image is out of focus or blurred, if the position of the marked ROI and the position of the ROI during focusing do not change, a user can quickly identify that the reason of the out-of-focus or blurred image is not caused by inappropriate setting of the ROI. Especially for human face imaging, if a frame of the marked ROI is within a human face region, and if an image is blurred or out of focus, the factor of inappropriate setting of the ROI can be excluded.

In order to implement the above embodiments, the present disclosure further provides a computer program product, when instruction in the computer program product is executed by a processor, the focus region display method according to the above embodiment is executed.

In order to implement the above embodiments, the present disclosure further provides a non-transitory computer readable storage medium, which stores a computer program; when the computer program is executed by a processor, the focus region display method according to the above embodiment can be implemented.

In the description of the present specification, the description with reference to the terms "one embodiment", "some embodiments", "example", "specific example", or "some examples", and the like, means that a specific feature, structure, material, or characteristic described in connection with the embodiment or example is included in at least one embodiment or example of the present disclosure. Thus, the illustrative descriptions of these terms throughout this specification are not necessarily referring to the same embodiment or example. Furthermore, the described specific features, structures, materials, or characteristics may be combined in any suitable manner in any one or more embodiments or examples. Additionally, in the condition of no contradiction, one of ordinary skill in the art can link or combine different embodiments or examples and features of different embodiment or examples described in this specification.

In addition, terms such as "first", "second", and the like, are used merely for purposes of description, and are not intended to indicate or imply relative importance or to implicitly indicate the number of indicated technical features. Thus, a feature defined with "first", "second", and the like may indicate or implicitly include at least one such feature. In the description of the present disclosure, "a plurality of" means at least two, such as two, three, and so on, unless there is another explicit and specific limitation.

Any description of a procedure or a method described in a flow chart or by other means here can be considered as indication of comprising one or more module(s), segment(s), or part(s) of codes of executable instruction configured to implement steps of a customized logic function or process, and the range of the preferred embodiments of the present disclosure includes other implementations, which can execute functions without conforming to the shown or discussed sequence, for example, based on the related functions, according to a substantially simultaneous way or according to a reverse sequence; this should be understood by technicians in the technical field of the embodiments of the present disclosure.

The logic and/or steps described in other manners herein or shown in the flow chart, for example, a particular order list of executable instructions for realizing the logical function, may be specifically achieved in any computer-readable medium to be used by an instruction execution system, a device or an equipment (such as a system based on computers, a system including processors or other systems capable of acquiring an instruction from the instruction execution system, device and equipment and executing the instruction), or to be used in combination with the instruction execution system, device and equipment. As to the specification, "the computer-readable medium" may be any device adaptive for including, storing, communicating, propagating or transferring programs to be used by or in combination with the instruction execution system, device or equipment. More specific examples of the computer-readable medium may include but be not limited to: an electronic connection (an electronic device) with one or more wires, a portable computer enclosure (a magnetic device), a random-access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), and the like.

One of ordinary skill in the art can understand that the implementation of all or some steps of the methods of the above embodiments can be completed by related hardware instructed by a program, the program can be stored in a computer readable storage medium; the program, when being executed, comprises one or a combination of the steps of a method embodiment.

In addition, each functional unit in each embodiment of the present disclosure may be integrated into one processing unit, or each unit may exist physically separately. Alternatively, two or more units may also be integrated into one unit. The above integrated unit can be implemented in the form of hardware or in the form of a software functional unit. The integrated unit, if implemented in the form of a software functional unit and sold or used as an independent product, can also be stored in a computer readable storage medium.

The aforementioned storage medium can be a read-only memory, a magnet disk, a compact disk, etc. Although embodiments of the present disclosure have been shown and described above, it would be appreciated that the above embodiments are illustrative, and cannot be construed to limit the present disclosure. Changes, modifications, alternatives, and transformation can be made to the above embodiments by those skilled in the art without departing from scope of the present disclosure.

What is claimed is:

1. A method for focus region displaying, comprising:
    acquiring a target ROI from a preview image of a target object captured by an image sensor;
    photographing the target object to acquire image data; and
    during generating an image through the image data, marking a position of the target ROI in the image generated through the image data to determine whether an out-of-focus or blurred image is caused by inappropriate setting of the target ROI, comprising
       drawing a frame for the target ROI;
       acquiring a first coordinate of an initial pixel in the image and a plurality of second coordinates of pixels in the target ROI;
       determining a target position of the target ROI in the image according to the first coordinate and the plurality of second coordinates; and
       displaying the frame of the target ROI on the target position of the image.

2. The method of claim 1, wherein, the drawing the frame for the target ROI comprises:
    selecting a preset number of rows as a position where a first lateral edge of the frame is located by starting from a first row of pixels of the target ROI;
    selecting a preset number of rows as a position where a second lateral edge of the frame is located by starting from a last row of pixels of the target ROI;
    selecting a preset number of columns as a position where a first longitudinal edge of the frame is located by starting from a first column of pixels of the target ROI;
    selecting a preset number of columns as a position where a second longitudinal edge of the frame is located by starting from a last column of pixels of the target ROI; and
    generating the frame by drawing the first lateral edge, the second lateral edge, the first longitudinal edge, and the second longitudinal edge according to a preset format.

3. The method of claim 1, wherein acquiring the plurality of second coordinates of pixels in the target ROI comprises acquiring the second coordinate of each pixel in the target ROI from the image data of the target ROI; and
    determining the target position of the target ROI in the image according to the first coordinate and the second coordinates comprises:
       calculating a position relation of each pixel of the target ROI relative to the first coordinate of an initial pixel of the formed image in response to acquiring the second coordinate of each pixel of the target ROI; and
       determining the target position of the target ROI in the formed image in response to acquiring the position relation of the second coordinate of each pixel in the target ROI relative to the first coordinate.

4. The method of claim 1, further comprising:
    before acquiring the target ROI from the preview image of the target object captured by the image sensor, determining that the target object is in a stable state according to the preview images captured continuously and being in compliance with a preset number of frames.

5. The method of claim 4, wherein, the determining that the target object is in the stable state according to the preview images captured continuously and being compliance with the preset number of frames comprises:
    activating a photographing apparatus;
    counting the number of the image frames of the preview image captured by the image sensor;
    acquiring a moving speed of the target object according to all captured preview images in response to the number of the image frames reaching a preset number of frames; and
    determining that the target object is in a stable state in response to the moving speed being within a preset range.

6. The method of claim 4, wherein, the acquiring the target ROI from the preview image of the target object captured by the image sensor comprises:
    taking an ROI in a preview image of the target object in the stable state as the target ROI.

7. The method of claim 1, wherein the ROI comprises a focusing region.

8. The method of claim 7, wherein the method further comprises:
    after the displaying the position of the target ROI in the image:
       in the condition that the target object is a human face, identifying whether a human face region appeared in the image is blurred; and determining whether the blurred appeared human face region is caused by a focusing error according to a coincidence degree between the target ROI and the appeared human face region in response to the appeared human face region being blurred.

9. The method of claim 8, wherein, in the condition that the target object is a human face, identifying whether the human face region appeared in the image is blurred comprises:
   identifying a human face region in the image by a human identification algorithm;
   acquiring pixel values of the human face region;
   acquiring color and brightness of the human face region according to the pixel values;
   comparing the color and brightness of the human face region with preset threshold values of color and brightness corresponding to a clear human face;
   determining the human face region is blurred in response to the color and brightness of the human face region being less than the threshold values.

10. An apparatus for displaying focus region, comprising a set of computer instructions stored on a non-transitory computer readable medium and executable by a computer processor to:
   acquire a target ROI from a preview image of a target object;
   photograph the target object to acquire image data;
   during a process of imaging using the image data, mark a position of the target ROI in the image generated through the image data to determine whether an out-of-focus or blurred image is caused by inappropriate setting of the target ROI;
   draw a frame for the target ROI;
   acquire a first coordinate of an initial pixel in the image and a plurality of second coordinates of pixels in the target ROI;
   according to the first coordinate and the second coordinates, determine a target position of the target ROI in the image; and
   display the frame of the target ROI on the target position of the image.

11. The apparatus of claim 10, further comprising a set of computer instructions stored on a non-transitory computer readable medium and executable by a computer processor to:
   select a preset number of rows as a position where a first lateral edge of the frame is located by starting from a first row of pixels of the target ROI;
   select a preset number of rows as a position where a second lateral edge of the frame is located by starting from a last row of pixels of the target ROI;
   select a preset number of columns as a position where a first longitudinal edge of the frame is located by starting from a first column of pixels of the target ROI;
   select a preset number of columns as a position where a second longitudinal edge of the frame is located by starting from a last column of pixels of the target ROI; and
   draw the first lateral edge, the second lateral edge, the first longitudinal edge, and the second longitudinal edge according to a preset format, thereby form the frame.

12. The apparatus of claim 10, further comprising a set of computer instructions stored on a non-transitory computer readable medium and executable by a computer processor to:
   determine that the target object is in a stable state according to preview images captured continuously and being compliance with a preset number of frames.

13. The apparatus of claim 12, further comprising a set of computer instructions stored on a non-transitory computer readable medium and executable by a computer processor to:
   activate a photographing apparatus;
   count the number of the image frames of the preview image captured by the image sensor;
   when the number of the image frames reaches a preset number of frames, according to all captured preview images, acquire a moving speed of the target object; and
   based on a determination that the moving speed is within a preset range, determine that the target object is in a stable state.

14. A non-transitory computer readable storage medium for storing computer executable instructions for performing the operations of:
   acquiring a target ROI from a preview image of a target object captured by an image sensor;
   photographing the target object to acquire image data;
   during generating an image through the image data, marking a position of the target ROI in the image generated through the image data to determine whether an out-of-focus or blurred image is caused by inappropriate setting of the target ROI; and
   in response to acquiring the target ROI from the preview image of the target object captured by the image sensor, activating a photographing apparatus, counting the number of the image frames of the preview image captured by the image sensor, acquiring a moving speed of the target object according to all captured preview images in response to the number of the image frames reaching a preset number of frames, and determining that the target object is in a stable state in response to the moving speed being within a preset range.

15. The non-transitory computer readable storage medium of claim 14, wherein, the operation of displaying a position of the target ROI in a formed image comprises:
   drawing a frame for the target ROI;
   determining a target position of the target ROI in the image; and
   displaying the frame of the target ROI on the target position of the image.

* * * * *